Feb. 16, 1960 G. R. COSS 2,924,898
IRONER
Filed March 23, 1956 9 Sheets-Sheet 1

INVENTOR.
GEORGE R. COSS
BY
ATTORNEYS

Feb. 16, 1960   G. R. COSS   2,924,898
IRONER
Filed March 23, 1956   9 Sheets-Sheet 2

INVENTOR.
GEORGE R. COSS
BY
ATTORNEYS

Feb. 16, 1960  G. R. COSS  2,924,898
IRONER
Filed March 23, 1956  9 Sheets-Sheet 4

INVENTOR.
GEORGE R. COSS
BY
ATTORNEYS

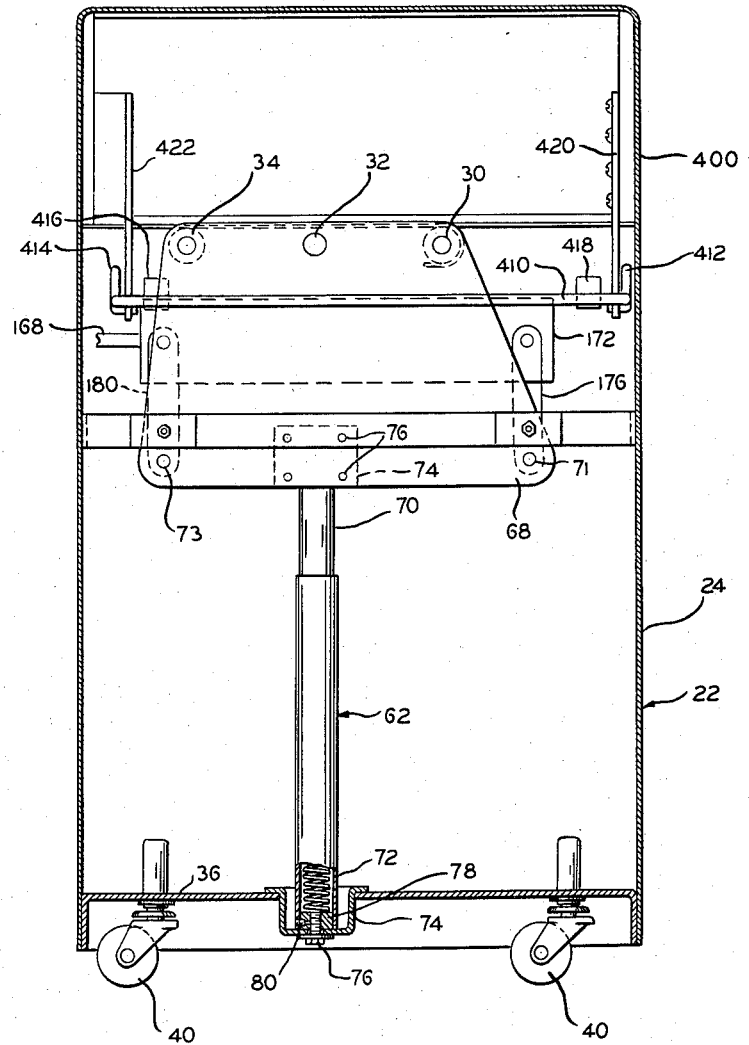

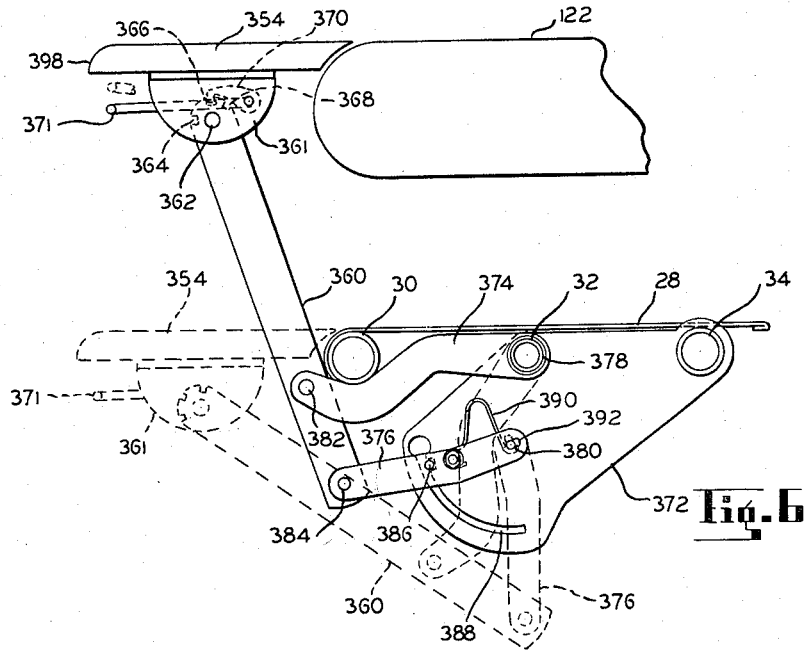
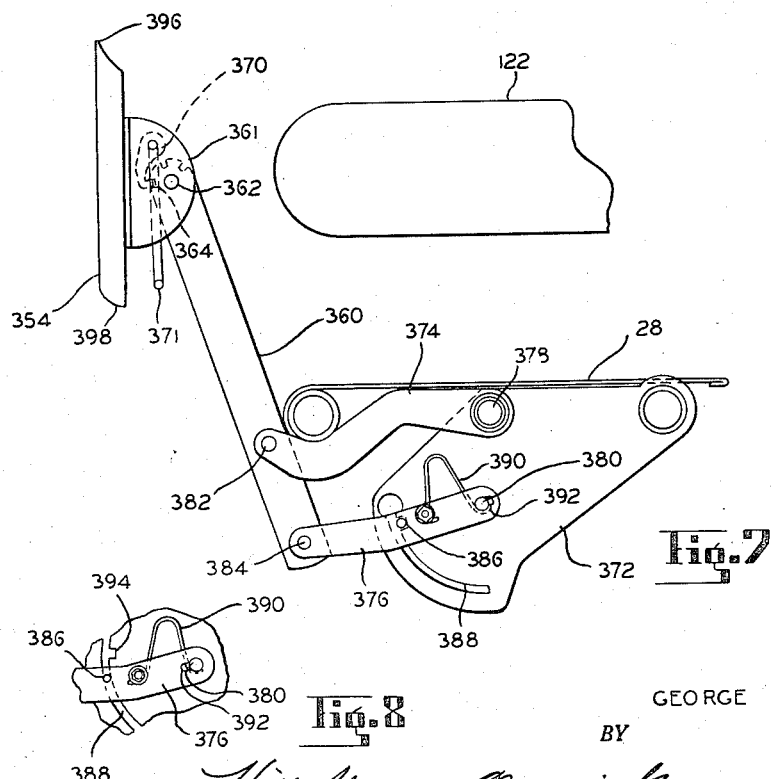

Feb. 16, 1960  G. R. COSS  2,924,898
IRONER
Filed March 23, 1956  9 Sheets-Sheet 7

INVENTOR.
GEORGE R. COSS
BY
ATTORNEYS

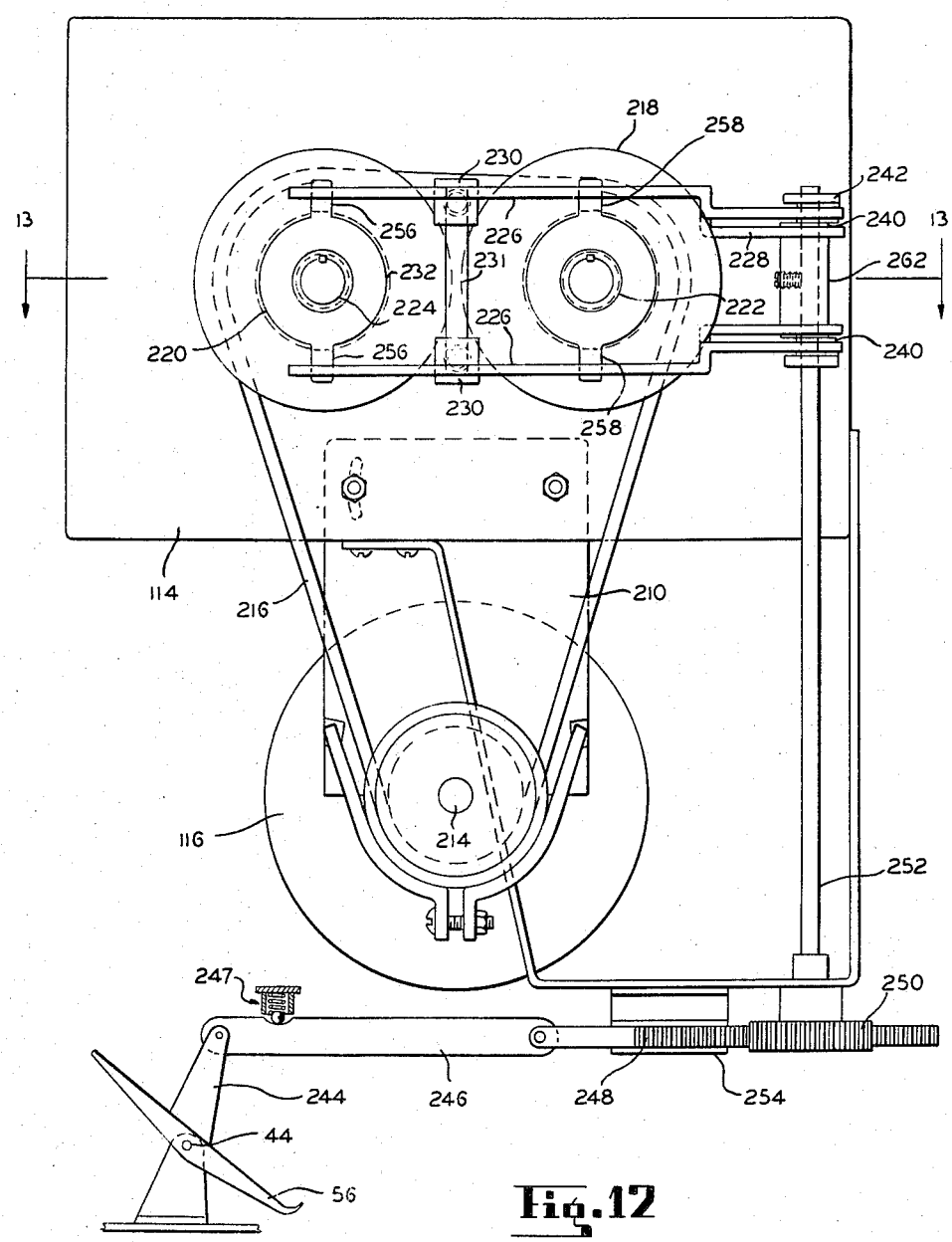

United States Patent Office 2,924,898
Patented Feb. 16, 1960

2,924,898

IRONER

George R. Coss, Benton Harbor, Mich., assignor to Whirlpool Corporation, a corporation of Delaware Application March 23, 1956, Serial No. 573,529

28 Claims. (Cl. 38—11)

The present invention relates to improvements in ironing machines and especially to ironing machines of the domestic or home laundry type.

In the conventional type of home laundry ironing machine the machine is supported in a cabinet and operated by the housewife in a seated position wherein she feeds the garments to be ironed through the ironer. The ironing mechanism consists primarily of a smooth heated shoe against which the material is pressed, generally by a pressure pad in the form of a roller which is power driven to carry the material against the shoe to perform the ironing operation. The operator or housewife from her seated position operates the ironing machine by turning on the heating element for heating the ironing shoe, starting the padded pressing conveying element which carries the garments in ironing contact with the shoe, and bringing the shoe and pressing element together into ironing engagement when the garment is in the correct ironing position.

The conventional ironer employs power means for driving the padded conveying roller and the same power means, used usually in the form of an electric motor, controls the relative position of the padded ironing roller and the ironing shoe so that they may be brought together or separated. It is important in the domestic type of ironing machine that the mechanism be simply constructed so as to be quickly operable by the inexperienced housewife with a minimum of training. The controls must be positioned and must operate the elements so that they are fool-proof and simple. Further, any improvement which simplifies or smoothes the operation of the machines will greatly enhance its attractiveness as a household appliance to the housewife making the appliance more stable and making it a true contribution to the improvement of household appliance art.

In addition to operational attractiveness the machine should be functionally attractive in that it must be capable of being closed and stored in a compact closed condition which will not gather dust, which is easy to clean, attractive in appearance and relatively compact and inconspicuous. The latter is important if the laundry is in the kitchen and the machine must be capable of being stored in a relatively small place.

In addition of the foregoing features the ideal home laundry ironer should be durable and reliable in order that it may continuously operate without need of adjustment or repair and this should be accomplished by design which is simplified and requires a minimum number of parts to thereby also effect an economy of construction.

The primary object of the present invention is to provide an ironing and pressing surface which is more readily accessible and convenient to use than has been commonly known before with the conventional roll type ironer.

Another object of the present invention is to provide an ironing machine of the domestic home laundry type which is quiet and smooth running.

Another object of the invention is to provide an ironing machine that is power operated and in which simplified operating mechanisms are provided for driving the operating parts and which can be easily, quickly and positively controlled with a minimum of experience required on the part of the operator, and which is more readily responsive to the desires of the operator.

Another object is to provide a home ironing machine in which the operating parts can be easily moved to a closed position wherein they are compact and present a smooth finished outward appearance for storing the machine and wherein the machine requires a minimum of storage space and is easy to maintain in a clean condition.

Another object of the invention is to provide an ironing machine which can be stored in accordance with the foregoing objective and which can simply, readily and quickly be opened and put into operation.

A more specific object of the invention is to provide an ironing machine of the domestic type in which the ironing shoe can be moved to a plurality of positions for operation of the machine, storage of the machine, or improved access to the padded pressing conveyor is obtained for improving the ease of operating the machine.

Another object of the invention is to provide a special extension shelf for the end of the ironing machine which is of improved construction in that it may be simply operated to perform the function of a utility shelf, to provide access to the end of the conveying belt, to serve as a support for large items of flatwork and, also, function to complete the enclosure of the cabinet when it is in storage condition.

Other objects and advantages of the invention will become more apparent in the following specification and claims taken in connection with the appended drawings, in which:

Figure 3A is a plan view of a part of the mechanism for locking the ironing shoe in place;

Figure 5 is a sectional view taken along the line 5—5 of Figure 3;

Figure 6 is an enlarged detailed view illustrating the operating mechanism for the extension shelf of the ironing machine;

Figure 7 is another enlarged detailed view of the forward extension shelf which is also shown in Figure 6 and illustrating another operating position of the shelf;

Figure 8 is an enlarged fragmentary detail view illustrating the latch for locking the shelf in one of its operating positions;

Figure 12 is an enlarged detail view taken from the end of the belt drive mechanism which drives the machine and controls the speed of operation.

In the preferred embodiment, as fully disclosed by this description, the mechanism is shown housed in a cabinet illustrated generally at 22. This cabinet may be seen in its full appearance in Figures 1 and 2, and in sectional appearance in Figures 3, 4 and 5, with the sectional view of Figure 4 illustrating the right end of the machine and the sectional view of Figure 5 illustrating the left end of the machine. The cabinet will be formed of sheet metal which is shaped such as by pressing or stamping, and will be coated with a smooth finished appliance enamel to present an attractive appliance for use in the home kitchen or the home laundry. The cabinet, in the present machine, however, serves primarily as a decorative and protective function, and an important feature of the invention is the suspension of the entire operating mechanism free from direct support from the cabinet.

The cabinet 22 consists of a right hand enclosing column 26 and a left hand enclosing column 24. The sectional views through these columns may be respectively seen in Figures 4 and 5, and from these figures, it will be seen that the right hand column is larger than the left hand column since it must enclose the motors and gears which perform the major operational functions of the machine. The left hand cabinet column 24, as shown in Figure 5, is provided with a floor 36 which supports a pair of casters 40—40 to permit rolling the appliance along the floor of the laundry or kitchen. The right hand column 26 is provided with a similar floor 38, and this floor also contains holes to receive casters such as the caster shown at 42. These casters may be arranged to rotate about a fixed horizontal axis or may be of the swivel type, as is shown by the caster 42 to permit a greater dexterity for conveying the ironer.

Figure 3:
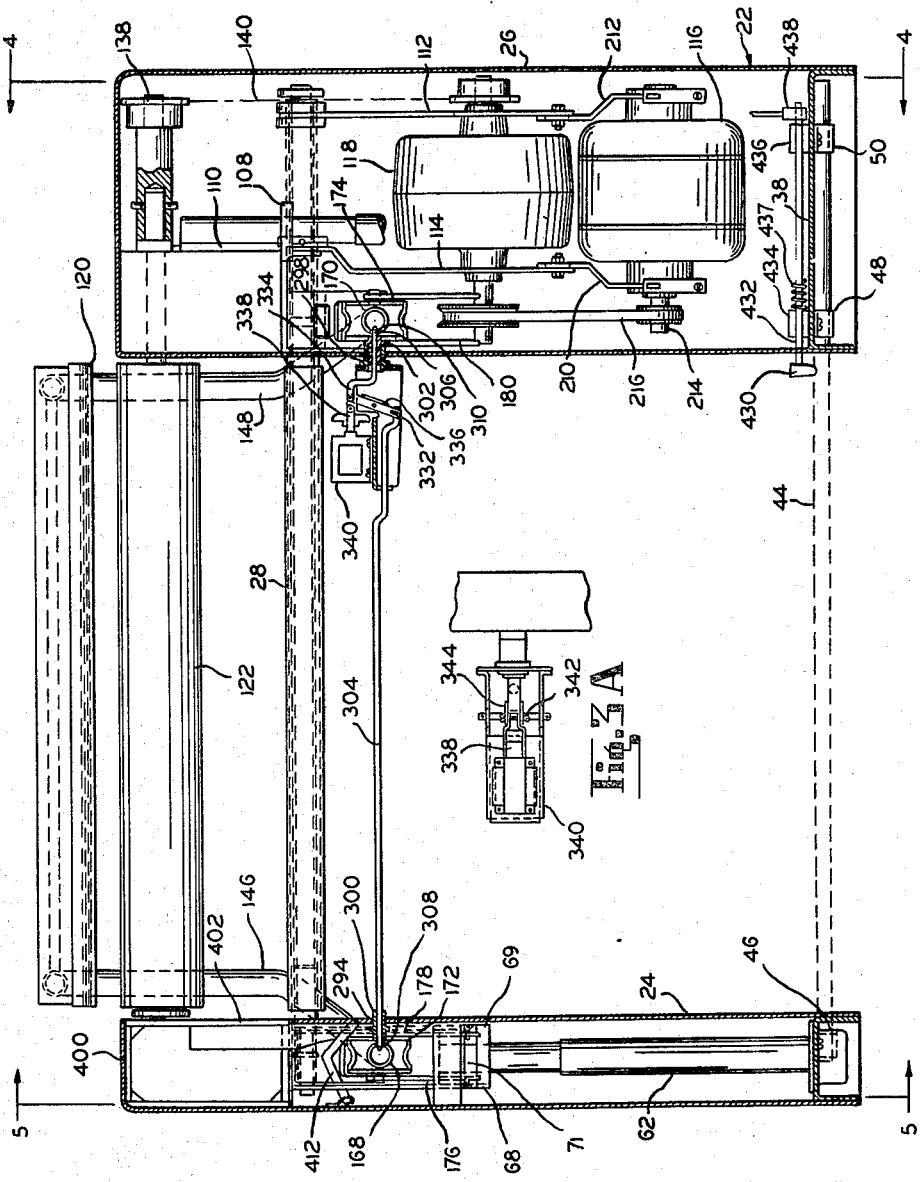
Figure 3 is a front elevational view taken in vertical section through the front of the machine to illustrate the operating parts within the machine cabinet.
Figure 4:
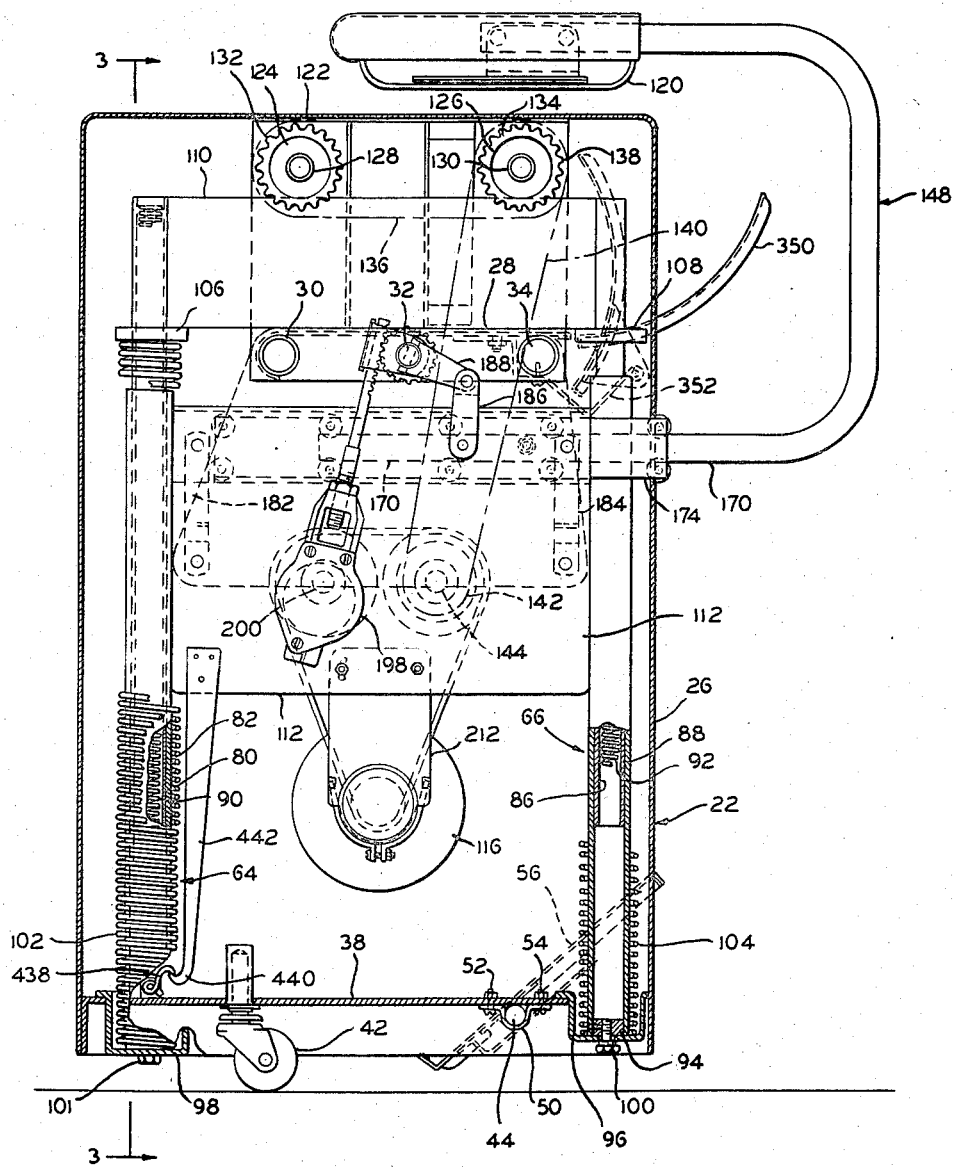
Figure 4 is a sectional view taken along the line 4—4 of Figure 3.

As will be seen in Figure 3, a tie-rod 44 extends across the base of the machine connecting the two columns 24 and 26 of the cabinet. The tie-rod is secured to the columns by U-shaped clamps which are bolted to the floors of each of the columns. The clamp 46 holds the left end of the tie-rod to the left hand column 24 and the clamps 48 and 50 hold the right hand end of the tie-rod to the right column 26. As will be seen from Figures 3 and 4, the clamps are bolted to the floor of the column and as illustrated by the clamp 50 in Figure 4, bolts 52 and 54 extend upwardly through the floor and are secured to hold the clamp in place and firmly hold the tie-rod against the floor to thereby fix the spacing between the lower ends of the columns.

In addition to providing a frame member, the tie-rod also serves as a support shaft for the speed control treadle 56. This treadle may be seen in Figures 1, 2 and 4 and in the position shown is easily accessible by the operator who puts her feet on the treadle to rock it back and forth pivoting it about the tie-rod 44 to control the speed and direction of movement of material through the machine. The mechanism which is controlled by pivoting or tilting this treadle will be described later in greater detail. The treadle is usually faced on its upper surface with a frictional material such as a rubber mat 58 and has an upstanding flange 60 along its lower edge for the operator to rest the heel of her shoe during operation.

This completes the portion of the description that relates to the rigid frame parts of the machine. The remainder of the parts are suspended on the floating resilient suspension. This suspension consists of three vertical supports, the vertical resilient support of the left end of the machine being shown at 62 and the two vertical supports on the right end being shown at 64 and 66. One support is used at the left and two at the right end to obtain a balance of action for the machine since most of the operating mechanism is positioned on the right end and additional support strength is needed to support the additional weight of the operating mechanism.

The operating mechanism at the left end of the machine is secured and supported on the vertical resilient support 62, as will be seen in Figure 5, by a pair of flat vertical plates 68 and 69, Figures 3 and 5. The plates 68 and 69 are suitably connected to an inner cylindrical tube 70 which is telescopically fitted within an outer tube 72, the tube combination forming a resilient post 62 for supporting the left hand end of the machine.

The two spaced plates which are connected to the inner tube 70 of the resilient supporting post, are connected to each other by cross pins 71 and 73 at their bottom edge. These pins also act as pivotal pins for arms 176 and 180 in a manner which will later be described. At their upper ends the two plates 68 and 69 are connected by the three transverse rods 30, 32 and 34 which extend completely across the machine to attach to similar plates on the other side of the machine.

The inner telescopic tube 70 carries at its upper end an attaching member 74 which is connected by bolts 76 to the flat vertical supporting plates 68 and 69. The telescoping tubes 70 and 72 which together form the supporting post 62 are connected in the hollow column 24 of the cabinet of the machine by being mounted within a cup 74 set into a hole in the floor 36 of the cabinet column. A bolt 76 extends through a hole in the bottom of the cup 74 and threads into a plug 78 in the lower end of the outer tube 72. A locking set screw 80 is provided to prevent the plug 78 from vibrating out of its hole and the bolt therefore firmly secures the post 62 in place to resiliently support the vertical plates 68 and 69 in the left hand side of the machine.

With reference to the right hand end of the machine, Figures 3 and 4, which is enclosed within the cabinet column 26, the resilient supporting posts 64 and 66 each comprise a pair of telescopic tubes.

The inner tubes are numbered 80 and 86 and the outer tubes are numbered 82 and 88, and each inner and outer tube combines to form a post with the posts 64 and 66 respectively. The inner tube is slidably mounted within the outer tube and does not extend the full length of the outer tube being short of the bottom end thereof to permit vertical movement within the outer posts. Within the inner tube are coil compression springs 90 and 92 for the two posts 64 and 66 respectively. These coil compression springs rest at the bottom of the cups 96 and 98 and extend to the top of the inner tubes 80 and 86, each of which is closed at the top.

The outer tubes are firmly secured to the floor 38 of the cabinet to hold the posts in an upright position. The lower end of the post 66 rests in a cup 96 with the post 64 resting in a similar cup 98, the cups being sunk into holes in the floor 38 of the cabnet. A bolt 100 extends through a hole in the bottom of the cup 96 to be threaded into a plug 94 in tube 88 to secure the post 66 in place. Post 64 has a similar retaining bolt 101 to secure it.

Second coil compression springs, numbered 102 in the case of the resilient support 64, and numbered 104 in the instance of the resilient post 66, extend around the outer tubes and bear at the bottom ends in the supporting cups 98 and 96 and at the upper ends against collars 106 and 108. The collar 106 is connected to the inner telescoping tube 80 of the post 64 and the collar 108 is connected to the inner telescoping tube 88. The outer tubes 82 and 88 are short of the collars at the top to permit vertical sliding movement of the inner tubes within the outer right hand side of the ironer mechanism, a cross plate 110 is connected to the upper ends of the inner tubes 82 and 86 to rest on the collars 106 and 108. From this cross plate the mechanism is suspended. The suspension mechanism consists primarily of plates 112 and 114, as is shown in Figures 3 and 4. These plates are somewhat similar in construction to the plates 68 and 69 which were shown in Figure 5 and which are positioned on the left hand side of the machine. Plate 114 is secured along its upper edge, such as by welding, to the plate 110 as is shown in Figure 3. The plates 112 and 114 are connected at their upper edge to the transverse rods 30, 32 and 34 in the manner shown in Figures 3 and 4, and thus the plates 112 and 114 are tied together, and by the rods the left and right ends of the machine are tied together.

As will be seen in Figure 3, the plates 112 and 114 carry the motor 116 which furnishes the main motive power for operating the ironer. The plates 112 and 114 also suspend the gear casing 118 which contains a speed control gearing for controlling the speed and direction in which the garments are carried through the ironer. This gear casing 118 also contains the clutch for operating the ironing machine shoe by bringing it into ironing engagement with the pressing pad to thereby compress the garments between the ironing shoe and pad.

Figure 9:
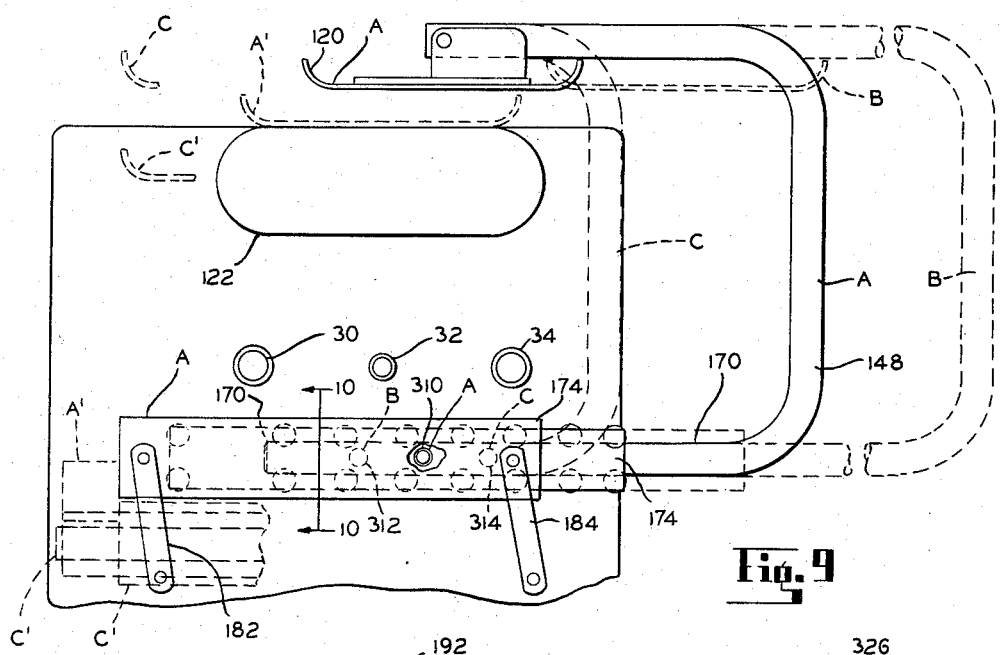
Figure 9 is a side elevational view of the mechanism for supporting and operating the ironing shoe with portions broken away to better illustrate the operating mechanism.

The ironing shoe 120, as is shown in Figures 2, 3, 4 and 9, is horizontally disposed having a downwardly facing smooth heated flat surface. The shoe contains within it heating elements to supply heat to the shoe and keep it heated during operation. The heating elements are not shown in detail since their intimate construction does not concern this invention. The shoe, as may be best seen in Figures 4 and 9, is normally located in poised position when the ironer is being used readily to be brought down against the soft pressing pad, 122 which is shown in the form of a traveling belt. When the shoe 120 and the pressing pad 122 are brought into operative engagement the garment to be ironed is pressed therebetween and heat from the heated shoe 120 is imparted through the garment to smooth it. The ironing shoe or buck 120 is illustrated in Figure 9 in the operative engaged position at the position labeled "A'." The poised position of the shoe when it is spaced from the belt is shown at "A."

The belt 122 is a conveying medium as well as a pressing medium operating to carry the garments beneath the smooth elongated shoe and for this purpose the belt is also horizontally disposed parallel to the shoe. The belt 122, Figure 4, is carried over a pair of elongated rollers 124 and 126 which may be in the form of elongated spockets having teeth to engage mating teeth in the belt to prevent slippage and insure a positive drive.

To drive the rollers 124 and 126 to move the endless belt beneath the ironing shoe, the shafts 128 and 130 which carry the rolls 124 and 126 have sprockets 132 and 134 at their outer ends. The sprockets are connected to each other by a belt or chain 136 which is trained over these sprockets. The shaft 130 which carries the sprocket 134, carries an additional sprocket 138 over which passes a drive chain 140 driven by a sprocket 142 which is carried on the belt drive output shaft 144 of the speed control gearing. The location of this output shaft with respect to the gear casing 118, which contains the speed control gearing, may be seen in Figure 13 and the mechanism associated with this gearing will be later described.

Returning to Figure 4, it will be seen that as the shaft 144 rotates and drives the sprocket 142 which in turn drives the sprocket 138 by means of the chain 140. Both of the shafts 128 and 130 are thus driven thereby driving the rolls 124 and 126 to move the pressing and conveying belt to carry the garments beneath the heated ironing shoe 120.

During operation the operator places the garment on the conveying belt 122 and when it is spread for feeding into the ironing machine, the shoe 120 is brought down against the belt 122. The belt is then driven forward to carry the garment beneath the heated ironing shoe.

Figure 2:
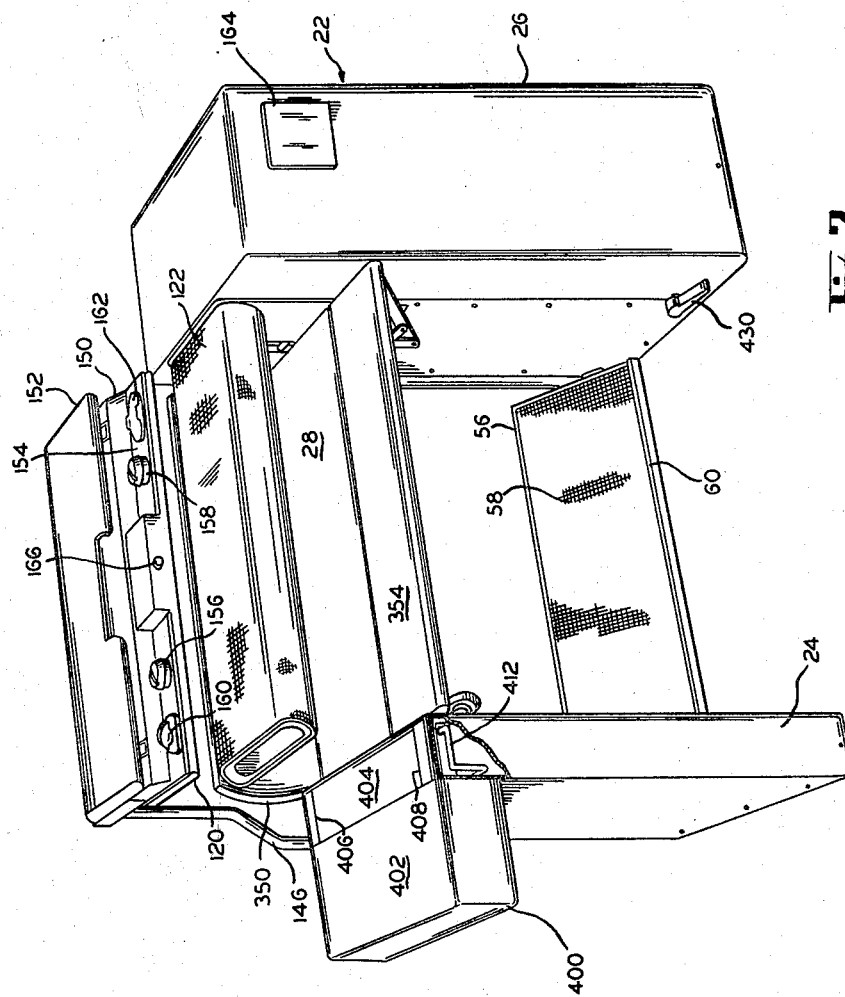
Figure 2 is a perspective view of the ironing machine in Figure 1, but illustrating the working parts in the opened or operating position.

The ironing shoe 120 is generally carried on a pair of U-shaped arms 146 and 148, as may be seen in Figures 2, 3, 4 and 9. The arms are shaped pipes or tubes which are formed to act as a support for the ironing shoe. With reference to Figure 2, the arms are secured to a plate 150 which supports the shoe 120. A movable cover 152 is provided which in operation is pushed back over the plate to expose the instrument panel 154, as is shown in Figure 2. The instrument panel 154 carries a pair of heat controls 156 and 158 which may be arranged to separately control the heat to either end of the ironing shoe 120. An additional switch control 160 may be provided arranged to be a main on-off control switch. Also provided on the instrument panel is a tool support 162 which may serve a variety of purposes for the housewife, such as a rest for hand appliances which she is using such as a temporary rest for a hand iron. Such an iron may be kept within the cabinet opening formed beneath the handy cover illustrated at 164 which is attached to the front face of the column 26 of the cabinet.

Also arranged on the control panel 154 is a small shoe position control push button 166. This push button will release the shoe support arms 146 and 148 and permit the shoe to be slid horizontally to a number of positions in a manner that will be described.

Normally when the button 166 is not depressed, the shoe is locked against horizontal sliding movement. The shoe then moves only to the operating position of engagement with the belt or back to the poised position as shown at "A" or "A'" in Figure 9.

The shoe supporting arms 146 and 148 have lower horizontal extensions 168 and 170, as shown in Figures 3, 4 and 9. These horizontal extensions are bent outwardly, as will be seen in the elevational view of Figure 3, so that they are positioned laterally outside of the ends of the ironing shoe 120 and ironing belt 122. This permits the supports for the horizontal extensions 168 and 170 of the arms to be housed within the vertical cabinet columns 24 and 26 which are also positioned laterally outside the ends of the heated ironing shoe 120. This lateral spacing avoids interfering with the operation of the ironing shoe and belt.

The lower horizontal lengths 168 and 170 of the shoe supporting arms 146 and 148 are housed for horizontal sliding movement within a pair of metal slides 172 and 174, Figures 3, 4 and 9. During normal operation, however, the arms will be locked within these slides so that they cannot slide back and forth and the slides themselves will be moved to carry the arms and the shoe down against the moving belt 122.

The slide 172 for the lower end 168 of the left shoe supporting arm 146 is carried at its forward end by a pair of pivotal supporting arms 176 and 178, as may be seen in Figures 3 and 5. At its rear end the slide is carried by a pair of similar arms which are obscured by the forward arms in Figure 3, but one of the arms 180 is visible in Figure 5. These arms 176, 178 and 180 are pivotally supported at their lower end. Arms 176 and 178, for example, are pivotally mounted on the cross pin 71, shown in Figures 3 and 5, and the pivotal arm 180 is pivotally mounted on the cross pin 73, as shown in Figure 5. The upper ends of the arms are pivotally secured to the side of the slide so that as the slide moves forward or backward the supporting arms will permit free movement thereof holding the slide horizontal but lowering it. When the slide moves forward, for example in Figure 5, the arms 176 and 180 will pivot forward and the slide will move downwardly. This will carry the shoe supporting arm 168, which is locked within the slide, downwardly and carry the ironer shoe downwardly against the ironing belt 122.

At the right end of the machine, the arm 148 and its lower horizotal end 170, which is supported by the slide 174, is given a similar motion to bring the shoe to the ironing position against the ironing belt 122. For this purpose the forward end of the slide is supported on pivotal arms 180 and 182, and the rear end by a pair of arms 184—184, as shown in Figures 3, 4 and 9, with only the arms on the rear side being visible, as shown in Figures 4 and 9. The lower horizontal extension 170 of the arm 148 is, of course, locked in the slide 174. When the slide 174 is pivoted forwardly, or to the left in Figures 4 and 9, the arms 182 and 184 will pivot forwardly to bring the slide downwardly to thereby bring the shoe 120 against the ironing belt 122.

Figures 10, 11:
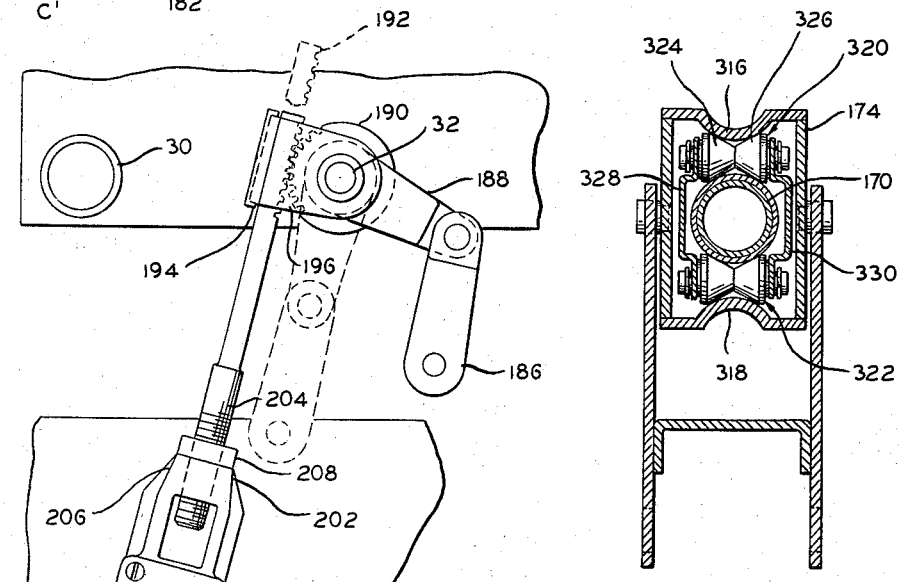
Figure 10 is a sectional view taken along line 10—10 of Figure 9.
Figure 11 is an enlarged detail view of the mechanism for moving the ironing shoe from a poised position above the padded pressing member to the operating ironing position.

For moving the shoe 120 from poised position, which is shown at A in Figure 9, to the ironing position, which is shown at A' in Figure 9, the operating mechanism shown in Figure 11 is employed. The operating mechanism employs a link 186 which is connected to the slide 174 in the manner shown in Figure 4. This pivotal connecting link is connected at its upper end to a pivotal arm 188 which is pivotally supported on the end of the tie-rod 32 and the location of this tie-rod may be observed in Figure 4 on the right end of the machine, and Figure 5 on the left end of the machine. The pivotal arm 188 which operates the link 186 connected to the slide 174, is operated by a pinion gear 190 which is pivoted by an intermeshing rack 192. The rack is held in engagement with the gear 190 by a pad 194 riding against its back surface and supported from a bracket 196 also secured to the shaft 32.

The rack is given reciprocal movement in order to pivot the gear 190 by being tied to an eccentric 198. The inner cam portion of the eccentric is connected to a shaft 200 and this shaft is the output shaft 200 shown in Figure 13 coming out of the gear casing 118.

Returning to Figures 4 and 11, the driven portion of the eccentric 198 is adjustably connected to the rack 192 by a threaded connection 202. The threaded connection consists of a threaded member 204, threaded into a nut portion 206 and held in its adjusted position by a lock nut 208. By adjusting this threaded connection 202 the pivotal position of the arm 188 will be determined. Thus, the adjustment of the length of the adjustable connection 202 will control the positions of the shoe 120 and regulate the amount of pressure exerted by the shoe against the belt 122.

Figure 13:
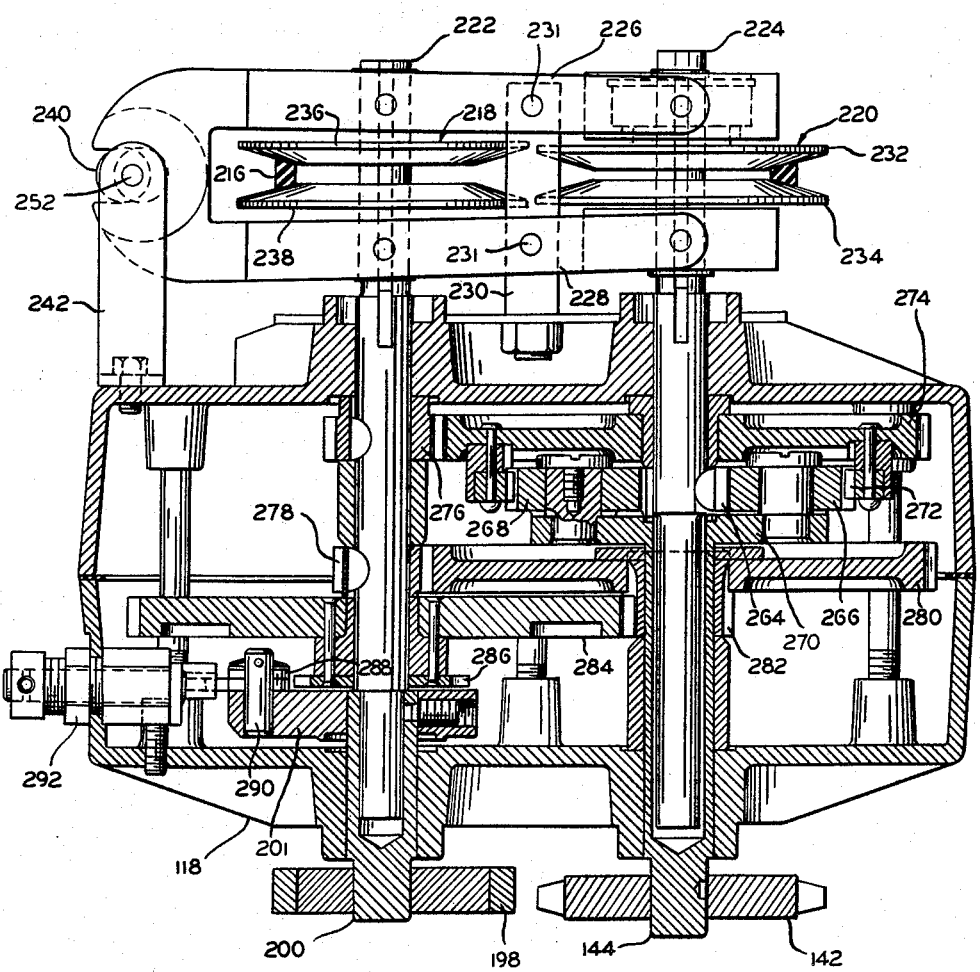
Figure 13 is a sectional view taken along line 13—13 of Figure 12.

The eccentric is arranged, as will be seen later with the description of the mechanism of Figure 13, to automatically stop in each of the extreme positions of the rack 192. In other words, the eccentric will be rotated by the shaft 200 only 180 degrees at a time and will stop at the end of each of 180 degree movement. The eccentric in Figures 4 and 11, for example, is shown at the extreme retracted position with the pivotal arm 188 pivoted to its extreme counterclockwise position. When the eccentric is driven by the shaft 200 it rotates through 180° and will automatically stop in the extreme projected position bringing the pivotal arm 188 and link 186 in the dotted line position of Figure 11. Moving this connecting link 186 to the dotted line position brings the slide 174 down to its lower position which is illustrated at the A' position of Figure 9. This brings the heated ironing shoe 120 down to the A' position of Figure 9 which is the operative ironing position. Rotation of the shaft 200 through another 180° as shown in Figure 11 will bring the link 186 back to its solid line position which, as shown in Figure 9, will return the slide 174 back to the solid line position and will return the heated shoe 120 back to the solid line position which is the A position.

For operating the mechanism the motive power is supplied by the electric motor 116. The motor, as shown in Figure 3, suspended on a pair of motor hangers 210 and 212 with the hanger 212 also illustrated in Figure 4. The hangers are suitably bolted to the lower edges of the plates 112 and 114. The motor has a drive shaft 214 which drives a belt 216 passing over a pair of adjustable sheaves 218 and 220, which are shown in detail in Figure 13. The adjustable sheaves are mounted on a pair of shafts 222 and 224 which lead into the speed control gear casing 118. The sheaves 218 and 220 are each constructed with a pair of separable sides to carry the V-belt 216 therebetween and the spacing between the sides of the sheaves controls the depths at which the V-belt rides within the groove between the sheave sections and will thus control the speed which the sheave as a whole will be driven. The split sheave sides are keyed to the shaft and permitted to be slid therealong. The distance between the halves or sections of the sheaves are controlled by a pair of rocker arms 226 and 228. These rocker arms are each pivotally mounted on a support arm 230 which projects from the casing 118 by means of pins 231.

The split sheave 220 has a first half 232 which is connected to the free end of the rocker arm 226 and a second half 234 which is connected to the free end of the rocker arm 228. The sheave 218 consists of a first section 236 which is connected to the inner end of the rocker arm 226 and a second section 238 which is connected to the inner end of the rocker arm 228. Thus, if the two rocker arms 226 and 228 are parallel, the sections of each of the two sheaves will be spaced apart a substantially equal distance to give each of them the same effective diameter and thereby cause the shafts 222 and 224 to rotate at the same speed. The position of the rocker arms and the speed of the shafts is controlled by a rocker arm control cam 240 which is supported from a bracket 242 secured to the gear casing 118. This cam 240 which controls the position of the rocker arm controls the output speed of the shaft 144 and also controls the direction of rotation of the shaft 144. The shaft 144, as will be recalled from the description of Figure 4, drives the ironing belt and thus the output of shaft 144 will drive the ironing belt at a faster or slower speed and will reverse the ironing belt to carry the material or the garment out from underneath the ironing shoe if the operator so desires.

Figure 1:
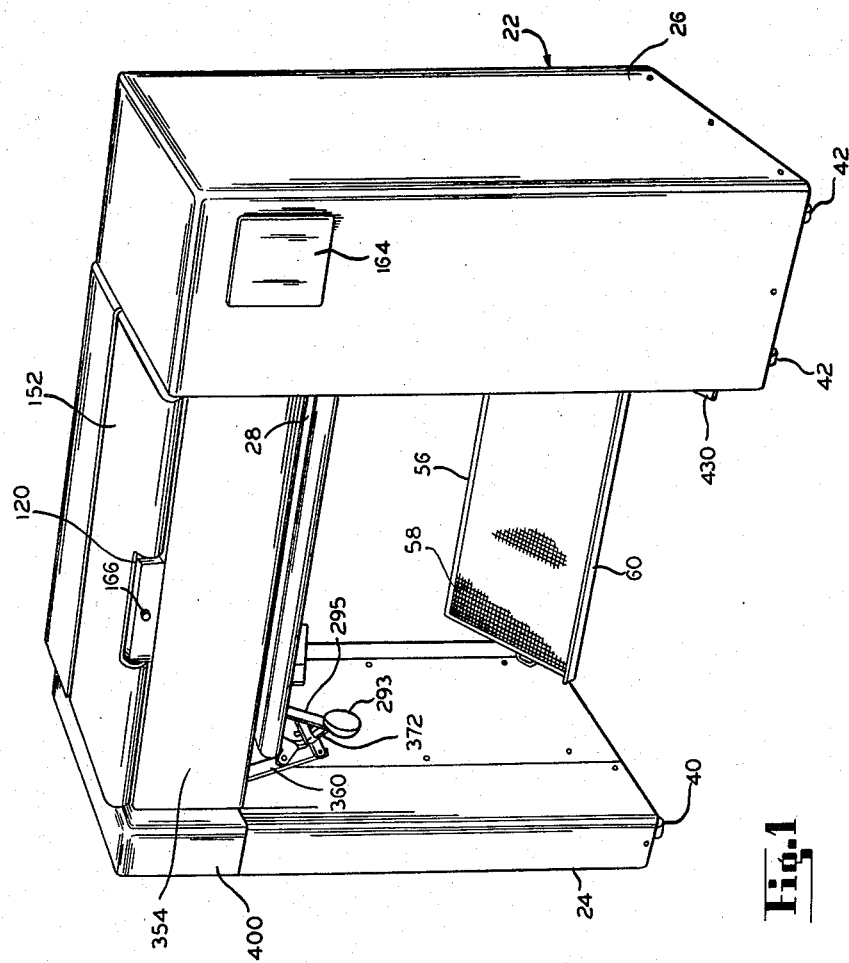
Figure 1 is a perspective view of the ironing machine shown with the operating parts in closed or stored position.

The control for controlling the cam 240 and thus controlling the forward or reversal of movement of the ironing belt is operated by the foot treadle which is shown at 56 of Figures 1 and 2. The connection between the foot treadle and the cam 240 is illustrated somewhat schematically in Figure 12.

The foot treadle 56 is pivotally mounted on the tie-rod 44 and has a small extension projecting into the interior of the cabinet column 26. This extension carries a pivotal operating arm 244. This crank arm 244 is pivotally connected to a link 246 which connects to a rack 248. The rack drives a pinion 250 which is connected to a cam control shaft 252 supporting the cam 240 at its upper end. The rack 248 is also provided with a guide 254.

As will be seen from Figure 12, the cam 240 is comprised of two cam sections and the rocker arms 226 and 228 are also arranged in duplicate with one set above the shafts 222 and 224 and another set below the shafts. Various forms of connections between the rocker arms and the split sheaves may be arranged and, as illustrated in Figures 12 and 13, the set of rocker arms 226 closest the observer in Figure 12 each cooperate with a set of pins 256 which connect the arms to the hub of the portion 232 of the split sheave 220 and movement of the rocker arm will cause the pins to move inwardly or outwardly with the hub of the sheaves moving the section of the sheave outwardly on the shaft 224. The sheave 218 is controlled in a similar manner with the rocker arms 226 cooperating with pins 258 which extend into the hub of the sheave section 236. The control for the rocker arm 228 may be operated in the same manner and need not be described in detail.

The cams 240 are in contact with the arms 226 and 228, each of which consists of a set of arms. A spacer member 262 is provided separating the arms of each pair. As the cam 240 is rotated, the rocker arms 226 and 228 will pivot about their pivotal supports in one direction or the other to increase the effective diameter of one of the sheaves 220 and decrease the effective diameter of the other sheave 218. Rotation of the cam in the other direction will have the opposite effect.

When the split sheaves are of the same effective size, the shafts 222 and 224 will rotate at the same speed. This will result in a zero output in the shaft 144, which is the output shaft for driving the ironing belt 122. To accomplish this a differential gear arrangement is arranged within the casing 188 shown in Figure 13, with the spider supporting the planetary pinions of the differential being effectively driven by the shaft 222 and the ring gear of the differential being driven by the shaft 224 and the difference in speed resulting in the output of the shaft 144.

The shaft 224 carries a pinion 264 which meshes with the two planetary gears 266 and 268 of the differential, the two planetarys being carried on the spider 270 which is secured to the output shaft 144. The ring gear 272, which also meshes with the planetary gears 266 and 268, is carried on the gear 274 which is mounted for free rotation on the shaft 224, and which is driven by the pinion 276 carried on the shaft 222. Thus, the gears are so arranged that when the shafts 222 and 224 are rotated at substantially the same speed the spider 270 which is connected to the shaft 144 will be stationary. Thus, the input from shaft 222, as transmitted to pinion 276, gear 274 and ring gear 272 to the planetary gears 266 and 268, will cancel the drive of pinion 264 to the planetary gears. Increasing the effective diameter of the split sheave 218 will cause it to rotate at a slower speed and will also decrease the effective diameter of split sheave 232 causing it to rotate at an increased speed. This will yield an output of shaft 144 in one direction. Accomplishing the reverse by decreasing the effective diameter of split sheave 218 and increasing the effective diameter of split sheave 220 will yield an output of shaft 144 in the opposite direction. Thus, the operator, by pivoting the treadle 56, as shown in Figure 12, can vary the speed of the conveyor belt 122 and drive it in either direction.

In order to provide a positive neutral position of the treadle 56 (a position of zero belt speed), means such as a spring loaded ball detent 247, shown schematically in Figure 12, may be provided to cooperate with a notch in link 246. The engagement of the ball detent 247 may be readily felt by the operator. The positive zero speed position is important when the operator wishes to perform a pressing operation by just causing the shoe to come into contact with the belt, or in the event she should wish to use a small hand iron on ruffles or the like.

In addition to being a speed and directional control the shafts 222 and 224 also drive the mechanism for bringing the heated ironing shoe down against the ironing belt 122. To this end the shaft 222 drives a small pinion 278, in Figure 13, which in turn drives a gear 280 mounted for free revolution on a shaft 144. The gear 280 drives a small pinion 282 for reduction of speed which in turn drives a gear 284 mounted for free revolution on the shaft 222. The gear 284 has attached to it a notched clutch member 286. The notched clutch member 286 will drive a rocker arm 288 pivotally mounted on a pin 290 which is carried by means of a clutch drive arm 201 on the output shaft 200 which drives the eccentric 198, shown in Figures 4, 11 and 13.

The rocker arm arrangement 288 is operated by a clutch shown generally at 292 which functions, when actuated, to engage the rocker arm 288 to the clutch member 286 for 180° of revolution, thus driving the eccentric 198 through 180°. At the end of the 180° movement the clutch will automatically be disengaged for in that time the heated ironing shoe 120 will have been brought to operating engagement with the ironing belt 122. To carry the ironing shoe 120 away from the ironing belt the operator again actuates the clutch 292, whereupon the shaft 200 is driven to another 180° of revolution. The details of the rocker arm 288 and of the clutch are not shown herein for they are not a prime part of this invention and may be of the type disclosed in detail in Patent No. 2,318,422, Ringer. In any event, the 180° revolution clutch illustrated in this patent or any suitable clutch which will give 180° of movement to drive the shaft 200 to drive the eccentric 198 will be suitable for the purpose.

The operator causes the 180° revolution clutch to be engaged by pushing a knee control, shown at 293 in Figure 1. The knee control has a pad at its outer end which is mounted on an arm 295 connected to a control rod, not shown, which leads to the 180° clutch shown in 292 in Figure 13. Thus, the operator by merely pushing against the knee pad of the knee control 293 will cause engagement of the 180° revolution clutch to bring the ironing shoe down upon the ironing belt. At any time when the material has been drawn through the ironer beneath the shoe the operator may again push the knee pad to cause the clutch to advance the shaft 200 another 180° and bring the ironing shoe back to the poised position above the pad. Other suitable means may be interchanged for the knee control 293. For example, a mercury switch could be attached to the treadle 56 for operating a solenoid which in turn would actuate the clutch 292. Mechanism may also be provided, as is shown in the aforementioned Ringer patent, to rapidly release the shoe at any time during the ironing operation in the event the operator catches any part of her clothes on her person between the shoe and belt.

With reference to Figure 9, from the previous description, it will be seen that in order to bring the heated ironing shoe 120 against the ironing belt 122 from the position shown at A to the position shown at A', the supporting slide 174 is moved forward on its pivotal supporting arms 182 and 184 to the position of A'. To move the ironing shoe 120 back to the poised position, shown at A, the slide is returned to the solid line position of Figure 9. During this operation the sliding arms 148 have been locked with respect to the slides. To accomplish this locking the slide is provided with a hole and a locking bolt extends through a hole in the slide and through a hole, such as 310, 312 or 314, in the lower portion 170 of the shoe supporting arm. The mechanism for locking the shoe supporting arms in their position is shown in detail in Figure 3.

In order that the horizontally extending ironing shoe will be kept substantially even and parallel to the belt 122 the arms at both sides of the shoe are locked in their slides. As shown in Figure 3, each of the slides 172 and 174 is provided with holes 294 and 298. These holes are reinforced with bearing members 300 and 302 secured to the side of the slides such as by welding. Openings are provided in the cabinet for movement of the bearings when the slides move. The bearing members support the locking plungers 304 and 306. Each of the locking plungers consists of an extended rod which has a slightly tapered end so that it may be projected into the holes in the lower horizontal extensions 168 and 170 of the shoe supporting arms 146 and 148. The holes in the arms are shown at 308 and 310, shown in Figure 3, and it will be understood that a series of holes are provided along the inner surfaces of each of the arms in the locations, such as shown in Figure 9, in the arm 170 at 310, 312 and 314. Each of these holes represents a different position of the shoe supporting arms and thus a different position of the shoe. These horizontal positions of the shoe are not related to its operative positions when it moves from the poised position above the ironing belt at A to the position against the belt at A'. These horizontal positions are obtained by solely horizontal sliding movement of the shoe.

When the shoe is to be moved to a different horizontal position, irrespective of the operation of the shoe, the plungers 304 and 306 withdraw from the holes in the arms so that the arms can be horizontally slid along the slides. For slidably supporting the arms on the slides, they are provided with rollers, as is shown in the detailed drawing of Figure 10. As is illustrated in that drawing, the slide 174, which is constructed similar to the slide 172 and therefor only one need be described in detail, is formed of a substantially rectangular tube of material open at its end. The top surface and the bottom surface of the slides are provided with ridges 316 and 318 so as to form bearing surfaces within the hollow slide. Grooved rollers 320 and 322 are positioned between each of the ridges and the horizontal tube 170. Each of the rollers is centrally grooved to ride on the ridge and on the tube. The rollers are each rotatably supported on a pair of vertical connecting plates 328 and 330 which carry the rollers. The plates may be solid, but must be provided with openings to admit the locking plungers 304 and 306, shown in Figure 3. For greater clarity, the supporting rollers and their connecting plates are omitted from the drawings of Figure 3.

Thus, it will be seen that the horizontal extensions 170 of the supporting yoke shaped rods 148 are slidably mounted within each of the slides for rolling on the supporting rollers. The rollers support the rods rigidly and securely within the slides, and yet permit the shoe to be easily moved in a horizontal direction as the horizontal portions of the rod rolls within the ways.

In order to unlock the rods and permit the shoe to be moved horizontally, the locking plungers 304 and 306 in Figure 3 must be withdrawn. For this purpose a solenoid operating mechanism is arranged. The inner end 332 of the rod 304 and the inner end 334 of rod 306 are bent to be offset from each other so as to be able to connect to a pivotal rocker arm 336. This rocker arm is pivoted at a point lying substantially along the axial center of the locking plungers and counter-clockwise pivotal movement of the rocker arm 336, as shown in Figure 3, will withdraw the plungers from the rods 168 and 170 permitting them to slide along their supporting rollers in the slides. Pivotal movement of the rocker arm 336 in the other direction will push the locking plungers against the rods and when a locking hole, such as the holes 308 and 310, appears opposite the pointed plungers, the plungers will move to a locking position preventing any further horizontal movement of the ironing shoe.

For operating the rocker arm 336 and moving the plungers between locking and unlocking position, the plunger 338 of a solenoid 340 is pivotally secured to the rocker arm. As is illustrated in Figure 3a, the plunger 338 may be provided with a hole through which may be driven a cotter key 342 to connect to a connecting link 344 which in turn connects to the rocker arm 336. A spring, not shown, may urge the plunger of the solenoid 340 to its extended position which urges the locking plungers 304 and 306 into their locking position. At any time when the solenoid is energized the plunger 338 will be withdrawn to move the locking plungers 304 and 306 to their unlocked position.

The control switch or button for placing the solenoid 340 in the electrical circuit is shown at 166 on the control panel 154 of Figure 2. In this position it will be seen that the control button is within easy access to the operator and that the button can readily be worked by the operator at the same time that she slides the ironing shoe back and forth along its horizontal range of positions, these positions being shown in detail in Figure 9.

As was previously described, the normal position of the shoe 120 is in the position shown at A, in which it is poised above the ironer belt 122. In some instances, however, the operator may wish to have access to the entire surface of the belt in order to properly arrange a pleated garment or the like on the ironing belt before bringing the shoe into engagement with the belt. In order to better accomplish this, the operator may move the ironing shoe back to the "B" position, shown in Figure 9, and this will completely expose the upper surface of the ironing belt. Since the ironing shoe is supported by the arms for movement in a horizontal direction and the support consists of a series of frictionless rollers it will be seen that the shoe may be slid back and forth between the A and B position with almost an effortless motion. Since the slide is completely horizontal no weight of the shoe will have to be carried and the operator can readily accomplish this with the use of one hand.

It will be further seen that an almost limitless number of positions of the shoe relative to the ironing belt can be accomplished with this arrangement. Further, the shoe may be locked in any one of the positions by adding holes such as the holes 308 and 310 to the horizontal arms 168 and 170 of the shoe support arms 146 and 148.

An additional fixed position of the ironing shoe has been provided in the present device which brings the ironing shoe completely forward, as shown in Figure 9, to the C position. This is accomplished in the same manner as the shoe is moved back to the B position by merely actuating the solenoid 340 to move the locking plungers 304 and 306 to their unlocked position and pulling the shoe forward whereupon the horizontal extensions 168 and 170 will easily slide forward supported on their rollers. When the shoe reaches its forward or C position the solenoid is again deenergized and the locking plungers 304 and 306 slide into the holes in the arms to lock the shoe. This position, or the C position, is the position in which the shoe is placed before the machine is closed. In order to close the machine the supporting suspension springs at each end of the machine will be depressed and locked in their depressed position. This will bring the entire body of the machine down to the compressed spring position and will bring the shoe down from the C to the C' position, as is illustrated in Figure 9.

As is specifically illustrated in Figure 3, the ironer cabinet carries a hold down latch for locking the spring suspension of the mechanism in locked position when the machine is placed in storage or is not in use. The hold down mechanism has a manual release latch arm 430, the position of which is shown relative to the cabinet in Figures 2 and 3. The release latch 430 is shown connected to a release shaft 432 which passes through a pair of support brackets 434 and 436, Figure 3, mounted in the floor 38 of the cabinet column 26. A torque spring 437 is connected to the shaft 432 and to the support bracket 434 to tend to rotate the shaft toward latched position. When the mechanism is to be unlatched, the arm 430 is pushed down against the action of the spring.

On the inner end of the shaft 432 is a latching finger 438 which is shown in detail in Figure 4. The latching finger in locking position catches a hook 440 which is carried at the lower end of a downwardly extending arm 442, which is attached to the side plate 112. As is illustrated in Figure 4, the hook 440 has a rounded face which will cam the latching finger 438 outwardly when the machine is pushed downwardly to depress the springs and when the machine is depressed sufficiently the finger will drop over the hook 440 to hold the mechanism in latched position. When the machine is released the springs will be held in their depressed condition. The latching of the machine can be accomplished therefore by the operator merely pushing downwardly with slight effort on top of the ironing mechanism to depress the springs and when the operator releases the entire mechanism will be held depressed. A latching mechanism similar to that shown in Figure 4 can be provided for the outer end of the machine for more secure latching, although the latching on one end will hold the machine in locked position since the machine is held against twisting by the telescoping tube arrangement in which the springs are housed.

During the ironing operation it may be desirable for the large garments or cloth passing over the ironing belt 122 to pass to the rear of the machine where they may be caught on the tubes 168 and 170, or it may be desirable that smaller pieces be returned along the table surface 28 to the operator. With reference to Figure 4, an adjustable device is provided which can accomplish either of these two purposes. To this end a curved return panel 350 is provided. As shown in the solid position of Figure 4, the return panel is in its return position. In that position when the garments pass over the ironing belt 122 they will strike the inner surface of the return panel 350 and be guided rearwardly along the table surface 28. The operator then can easily reach beneath the ironing belt 122 and draw the ironed garments toward her.

If, however, she is ironing relatively large pieces of flat-work, she may desire to have the garments be discharged in the back of the machine she will move the return panel 350 to the dotted line position, as shown in Figure 4. In this position the back surface of the return panel 350 will come into effect and as the garments pass over the ironing belt 122 they will slide down over the back surface of the return panel 350 and drop down in back of the machine to be caught by the tubes 168 and 170. For this simple adjustment the return panel is hingedly supported on a bracket 352 which is secured to the cross-rod 34. Various types of hinging arrangements may be used, arranged to permit pivoting of the panel 350 between the solid line position and the dotted line position of Figure 4, and arranged to maintain the panel in either of the positions.

It will be noted in the closed position of the machine, shown in Figure 1, that the space between the table top surface 28 and the ironing shoe 120 is closed by panel 354. This panel and the mechanism for supporting and operating the panel are shown in detail in Figure 6. In operating position, as illustrated in Figure 2, the panel or forward shelf extension 354 will be placed in a position where it is parallel to the table surface 28 and will form an extension thereof, and function as a lap shelf or folding board. In this position the belt 122 is fully exposed to facilitate the arrangement of garments, or portions thereof, over the end of the belt. In the storage position the panel is positioned as is shown in Figure 1.

The forward shelf of panel 354 has an additional functional position which is shown in the solid line position in Figure 6. In this position the panel 354 is horizontally disposed and forms a continuation of the upper surface of the ironing belt 122. In this position it functions as a feed board and materials to be ironed may be supported for forming or smoothing directly opposite the point which the ironing belt meets the ironing shoe and this aids considerably in feeding the material into the ironing machine.

The forward extension shelf 354 is shown in Figures 6 and 7 supported on a movable supporting arm 360. The shelf is pivotally connected to the outer end of the arm and for this purpose carries brackets 361 with only one of the brackets being shown in the end view of Figures 6 and 7. The bracket is pivotally connected to the arm 360 at 362 and the end of the arm is provided with notches 364, 366 and 368. The notches are provided for purposes of locking the shelf in its horizontal or its vertical position and the bracket 361 connected to the shelf carries a pivotal locking finger 370, the end of which drops into one of the three notches 364, 366 or 368. The shelf is movable between the series of three positions and the top position is shown in Figure 6, the intermediate position is shown in Figure 7 and the lower position is shown in the dotted line drawing of Figure 6. For pivoting the shelf member 354 about its pivotal support 362, a manually operated unlocking extension 371 is provided, connected to the locking finger 370. Spring means may be provided to urge the finger to a locking position or the weight of the finger may be relied on. To lift the finger the manually operated lever 371, such as shown in Figure 6, is lifted from the solid to the dotted line position of that figure which moves the tip of the locking finger 370 out of the notch 366. The shelf 354 then can be swung about the end of the carrying arm 360 to any one of its three positions and when the desired position has been reached the arm 371 can be released to permit the finger 370 to move into one of the notches.

In addition to the shelf swinging pivotally about the end of the carrying arm 360, the carrying arm is movably supported. For supporting the entire assembly, a pair of brackets 372—372 are provided, one at each end of the machine with only one of the brackets being shown on the detail of Figures 6 and 7. These brackets are suitably supported just within the columns 24 and 26 of the cabinet with the position of one of the brackets 372 shown in Figure 1. The brackets are supported on the tie-rods 32 and 34 and project downwardly to carry a pair of pivotal arms 374 and 376, as shown in Figure 7. These arms extend substantially parallel to each other except that the arm 374 is bent so that it will extend around the tie-rod 30 without interfering with the rod and in the uppermost position the bent portion of the arm 374 rests against the tie-rod 30, as is shown in Figures 6 and 7. The pivotal supporting arms 374 and 376 are pivotally supported at their inner ends on the bracket 372 at 378 and 380 and at their outer ends to the carrying arm 360 at 382 and 384. The pivotal connections 378, 380, 382 and 384 are so arranged that the arms 374 and 376 extend substantially parallel and form a parallelogram linkage.

The lower pivotal arm 376 carries a friction locking pin 386 which slides along an arcuate slot 388 in the bracket 372. The lower arm 376 is biased in the direction so the locking pin 386 is biased against the inner side of the slot 388 to thereby increase its frictional engagement and hold the arm in the position to which it is forcibly moved. To obtain this frictional engagement a U-shaped spring 390 has one end connected to the pivotal arm 376 and the other end connected to the pin 380 which pivotally supports the inner end of the pivotal arm 376 on the bracket 372. To permit the spring 390 to be effective and move the pivotal arm 376 axially to force the friction pin 386 into engagement with the slot 388, the inner end of the pivotal arm 376 carries an elongated slot 392. The slot is substantially horizontal when the pivotal arm is in its upper position and extends radially along the arm so that the arm may have radial movement due to the effect of the spring 390.

In order to lock the pivotal arm 376 and the other mechanisms associated therewith in their upper position a notch 394 is provided in the end of slot 388, as is shown in the detail view of Figure 8. This notch 394 receives the locking pin 386 when the arm 376 is in the upper position, and the locking pin 386 is held in the notch 394 by the U-shaped spring 390. When the locking pin 386 is in the notch 394, the slot 392 at the base of the pivotal arm 376 permits the arm to move in the direction of the notch 394 so that the pin 386 will lock firmly therein. In order to change the position of the pivotal arm the pin 386 must be withdrawn from the notch to be moved along the arcuate slot 388. To do this the operator need merely push inwardly on the shelf member 354 which causes the carrying arm 360 to pivot about its point of connection 382 to the upper arm 374 to thereby slide the arm 376 to the left and move the locking pin 386 out of the notch 394. The arm may then be pivoted to the lower position, as is shown by the dotted line position in Figure 6. At this lower position the locking pin 386, of course, rests in the bottom of the arcuate slot 388 and will be solid in that position.

Summarizing, the shelf 354 in its lower position, as shown by the dotted line position of Figure 6, extends horizontally parallel to the plane of the table top 28 and the shelf is held in this position by the finger 370 being locked in the notch 368. The carrying arm 360 is held in the lower position by the lower pivotal arm 376 being locked by the locking pin 386 hitting the bottom of the arcuate slot 388. This is one of the operating positions of the shelf and another operating position is shown in the solid line figure of Figure 6, wherein the extension shelf 364 extends horizontally in a plane common to the upper surface of the ironing belt 122. To adjust the shelf to this position the shelf is pivoted so that the locking finger 370 locks in the intermediate notch 366 on the carrying arm 360. The carrying arm is raised to a point where the lower pivotal arm 376 is in the solid line position of Figure 6 and the locking pin 386 is in the notch 394, being held in this relationship by the action of the locking spring 390.

The intermediate position which is the solid line position of Figure 7 for the extension shelf 354 is not used until the machine is closed and put away. To do this, the operator pulls the ironing shoe to the forward position, such as shown in Figure 1. The extension shelf 354 is then placed in the intermediate vertical position shown in Figure 1 and shown in Figure 7. It will be noticed that in this position its upper edge 396 substantially meets the forward edge of the ironing shoe 122 to completely close the machine. Since the upper surface of the extension shelf 354 is finished in enamel, it will have the same appearance of the cabinet of the machine and thus the machine will present a neat compact closed cabinet. In this intermediate position for the extension shelf 354 the locking finger 370 is locked in the last notch 364 of the carrying arm. The carrying arm and its supporting links 374 and 376 are locked in the same position as they are for the upper position of the shelf, wherein the shelf is even with the upper surface of the ironing belt 122. Although the lower edge 398 of the extension shelf is spaced forward and above the table surface 28, as is seen in Figure 7, the opening between the ironing belt 122 and the table top surface 28 is substantially closed and from the angle of the average viewer the machine will appear to be completely closed since from normal eye level the viewer will not be able to see the table surface 28.

In a closed position of the ironing machine where the ironer is to be stored, the front shelf extension 354 closes the front of the machine and a protective end shelf 400 closes the end of the machine. This shelf may be viewed in Figures 1, 2, 3 and 5. This shelf member 400 is rectangular in shape and has the same thickness and appearance as the left hand column 28 of the cabinet and will form an extension thereof when folded to closed position. The protective end is a hollow sheet metal member shaped to the shape of the cabinet column 24 and given a decorative protective smooth finish the same as is carried by the cabinet. In the protective upright or folded position, the protective end 400 rests at the top of the cabinet column 24 and extends between the table surface 28 upwardly past the end of the conveying belt 122 to where it meets the ironing shoe 120 in its closed position, as is shown in Figure 1. In the open position of the ironing machine the protective end 400 is folded to the laterally extending position where its inside face 402 forms a horizontal extension of the table surface 28 to add to the available operating space afforded to the operator and exposes the end of the belt for arrangement of tubular articles or the like. Also available as an extension of the table surface 28 and bridging the space between the surface 402 of the protective end 400 and the table surface is the upper end 404 of the cabinet column 24. This upper end 404 is smooth and continuous to form an extension of the table surface 28, and is interrupted only by a pair of narrow transverse slits 406 and 408, and the purpose of these will readily become apparent. This structure is best viewed in Figure 2.

The protective end 400 is supported for folding to its lateral position by a hinge, best shown in Figures 3 and 5, which comprises a shaped hinge rod 410 which extends from the back to the front of the machine and carries at its ends a pair of angular shaped extensions 412 and 414. This hinge rod 410 is held within the cabinet column 24 for pivotal movement by a pair of clips 416 and 418 welded to the inside of the cabinet and pivotally holding the hinge rod 410. The outer ends of the extensions 412 and 414 of the hinge rod are bent toward each other and project into holes in the ends of arms 420 and 422 which are secured within the hollow protective end 400. When the protective end is moved to folded position the hinge rod 410 will pivot and its end extensions 412 and 414 will move to the position shown in Figure 2 where their lower portion rests against the inner surface of the cabinet. The arms 420 and 422 to which the hinge members are attached, slide within the slots 406 and 408 to permit the protective end 400 to be folded between the closed positions of Figures 1, 3 and 5 and the open position of Figure 2.

Thus, it will be seen that I have provided a new construction for a domestic type ironing machine which achieves the advantages and objects hereinbefore set forth. The mechanism is extremely smooth and quiet in operation which is very appealing to the operator and which also serves to extend the life of operation of the running parts and reduces the need for adjustment and repair. The resilient suspension which achieves the improved operation does not interfere with the other functional aspects of the machine, and the machine is adapted for compact rigid storage where it can be moved and handled or transported in any position without damaging the parts.

The machine also affords excellent dexterity of the parts during operation and improved ease of access to the operating elements so that the operator may more completely and more specifically arrange the garments which are to be handled by the machine. This improves the speed of operation and improves the performance of the machine obtaining an improved product.

I have, in the drawings and specification, presented a detailed disclosure of the preferred embodiment of my invention, but it is to be understood that I do not intend to limit the invention to the specific form disclosed but intend to cover all modifications, changes and alternative constructions and methods falling within the scope of the principles taught by my invention.

I claim as my invention:

1. In an ironing machine, a heated ironing shoe having a flat smooth horizontal undersurface for engaging and transmitting heat to the material to be ironed, a conveying belt having a flat resilient upper surface for conveying material in engagement with the flat surface of the shoe, shoe operating means connected to the shoe and operative to bring the shoe to cooperative engagement with the conveying belt, a support for the shoe, and a holder for said support, said holder permitting movement of the support and shoe in a horizontal plane along a horizontal path leading away from the conveying belt.

2. An ironing machine comprising in combination, a smooth ironing shoe, heating means located within the shoe to heat the shoe, resilient supporting means positioned opposite the shoe and adapted for movement relative to the shoe to carry material in sliding engagement therewith, actuating means adapted to bring the shoe and resilient supporting means into ironing engagement to press the material therebetween, a support for the shoe including a supporting arm, and a slide for slidably supporting the arm with the arm linearly movable in said slide to carry the shoe between a poised operative position and an extended position away from the resilient supporting means.

3. In an ironing machine, a heated smooth ironing shoe, means for carrying material in sliding engagement with the ironing shoe, a support for the ironing shoe holding the shoe in poised relationship to the carrying means, said support including a smooth supporting arm, and a series of supporting rollers in supporting engagement with said supporting arm for lateral movement of the shoe with respect to said carrying means so that the shoe may be moved away from the carrying means for easy access thereto.

4. In an ironing machine, a flat ironing belt having a supporting surface on which material to be ironed may be carried, a flat ironing shoe poised above the ironing belt to be brought into ironing engagement therewith, means for heating the ironing shoe, a support for the ironing shoe to hold it above the ironing belt, means to move the ironing shoe into ironing engagement with the belt, a pair of tubular arms extending from the shoe support, a housing surrounding the tubular arms and spaced therefrom, and rollers positioned vertically above and below the tubular arms and positioned within said housing to roll therein between the arms and housing to provide a frictionless support for the shoe support and to permit the tubular arms to roll back and forth within said housing in order that the shoe may be moved from a poised position above the belt to an extended position where access to the belt is easily obtained.

5. In an ironing machine, a horizontally movable belt for carrying articles to be ironed through the ironing machine, an ironing shoe adapted to be moved between a poised operating position above the belt and adapted to be brought into ironing operating position in engagement therewith, a support for the ironing shoe carrying it between its operating positions and permitting movement of the shoe to an extended position away from the belt, means to lock the support with the shoe in poised position above the ironing belt, and shoe operating means adapted to move the locked support and shoe from the poised position to a position of ironing engagement with the horizontally movable belt, said locking means being releasable and again engageable with the support to lock it with the shoe in extended position away from the horizontally movable belt in order to obtain free access to the upper surface of the belt.

6. In an ironing machine, a horizontally movable conveying belt for carrying items through the machine, an ironing shoe normally poised in a horizontal position above the belt and adapted to be moved into ironing engagement therewith to press an article therebetween, means for driving the conveying belt, a support for holding the ironing shoe above the belt and for carrying the shoe to its various positions, means for moving the support and shoe from said poised position to said position of engagement with the belt, said support including a pair of supporting arms projecting horizontally and having openings extending laterally therein, slides for said arms adapted to slidably support the arms and the support in order that the support may slide moving the ironing shoe between said poised position and an extended position where the upper surface of the conveying belt is completely exposed, and locking members adapted to be projected into said lateral openings in the supporting arms to lock the arms and shoe in their various positions.

7. In an ironing machine, a heated ironing shoe, conveying means for carrying material beneath the ironing shoe, means for driving said conveying means, a support for said shoe holding it in operative relationship to said conveying means, means for moving said shoe into operative engagement with said conveying means to press the material to be ironed thereagainst, a slide for said support permitting movement of the shoe from its operative position to an extended position where the conveying means is more fully exposed, a looking means for locking the support in said extended position and in said operative position, and a solenoid operated means connected to said locking means and adapted to release or to lock said locking means to maintain the shoe in the desired position.

8. In an ironing machine comprising in combination, a laterally extending conveying belt having a flat horizontal upper surface for supporting an article to be ironed, a laterally extending ironing shoe normally poised above the ironing belt and adapted to be brought down into cooperative engagement therewith pressing material therebetween, means for heating said ironing shoe, means for driving said belt forward to carry the article to be ironed beneath the shoe, a support for supporting the ironing shoe in its various operative positions, means for moving the support to carry the ironing shoe from a poised position above the conveying belt to an ironing position in engagement with the belt, a holder for said support permitting movement of the support to carry the shoe to an extended position away from the conveying belt to fully expose the upper surface of the belt, locking means to lock the support in said poised position above the belt or to lock the support in the extended position, and control means for operating said locking means and having an electrically controlled switch positioned on the shoe to be readily accessible to the operator when the operator is manually moving the shoe.

9. In an ironing machine, a heated ironing shoe, means for pressing cloth to the shoe to impart heat thereto and for conveying the cloth beneath the shoe, a support for holding the shoe in poised position and adapted to carry the shoe into engagement with the pressing and conveying means to press the cloth therebetween, means for locking the support permitting movement of the shoe from the poised position to the engaged position, said locking means being capable of being unlocked to permit the support to move to an extended position to expose the surface of the pressing and conveying means, said locking means comprising a pair of slidable locking arms adapted to engage with the support and lock it in position, a pivoted rocker arm connected between the inner ends of said locking arms, an electric motive means connected to the rocker arm and adapted to move the rocker arm from locked to unlocked position, and switch means for operating said electric motive means to control the position of said locking arms in order to move the support from the poised to the extended position.

10. In an ironing machine, an elongated flat smooth ironing shoe having a lower heated surface to be moved into engagement with material to be ironed, a moving elongated ironing belt with an upper surface extending beneath the shoe and adapted to carry material into ironing engagement therewith, a support for the ironing shoe, said shoe having a poised position above the belt, an operating position wherein the shoe is in pressing engagement with the belt, and an extended position where the shoe is moved away from the belt to expose the upper surface thereof, a pair of supporting horizontal arms extending from the support, separate slides for each of the arms permitting slidable movement of the arms to carry the support and move the shoe from the poised position above the belt to the extended position away from the belt, and limiting means terminating the sliding movement of the arms in the slides to prevent the arms from becoming disengaged from the slides when the shoe moves to extended position.

11. A mechanical ironing machine combination including an ironing shoe having a smooth ironing surface, means to impart heat to the shoe for ironing material, a conveyor adapted to be brought into relative pressing engagement with the ironing shoe to carry the material along thereagainst to be ironed in a direction from a receiving side to a discharge side of the shoe, and a guide positioned on the discharge side of the shoe to be engaged by the material after it has passed between the ironing shoe and the conveyor and adapted to direct the material back in a direction toward the receiving side of the shoe.

12. In an ironing machine, a laterally extending heated ironing shoe normally positioned in a poised position and adapted to move into engagement with material to be ironed, a conveying means positioned beneath the ironing shoe and adapted to carry material in sliding engagement with the heated ironing shoe to iron the material, and a deflector plate extending substantially the length of the ironing shoe and conveying means and movable between a first and a second position, the first position of the deflector plate being in close proximity to the conveying means so that the material will pass over the back of the deflector plate and be discharged to the rear of the conveying means, and the second position of the deflector plate being spaced from the conveying means so that the material will be guided along the inner surface of the deflector plate and be directed forwardly in the opposite direction in which it was moving when carried by the conveying means in engagement with the ironing shoe.

13. An ironing machine for domestic use comprising in combination, a flat conveying belt extending laterally across the machine and adapted to convey material beneath an ironing shoe, an elongated ironing shoe extending coextensively with said conveying belt and having a lower smooth heated surface to be pressed into engagement with the belt to press material to be ironed therebetween, a deflector plate extending along the conveying belt and the ironing shoe and positioned at the point of discharge of the material to be ironed from between the belt and shoe, and a supporting table surface spaced beneath the ironing belt, said deflector plate being positioned at the rear edge of said supporting table and pivotal between a first position where the upper edge is in close adjacency with the conveying belt to deflect the material which passes out between the shoe and belt to the rear of the machine and a second position where it is spaced from the conveying belt to deflect the material forwardly in an opposite direction along the top of the table surface.

14. An ironing machine comprising in combination a heated smooth ironing shoe, means for conveying cloth in pressing engagement with the shoe, a support for the shoe movable to carry the shoe between a poised position spaced from the conveying means and an operative position wherein the shoe is in pressing engagement with the conveying means, a pivotally movable arm attached to the support and adapted to move the support to carry the shoe between poised and operative positions with pivotal movement of the arm, a pinion gear secured to the arm, a rack in operative engagement with the pinion gear adapted to rotate the gear to move the arm to carry the support between its operative positions, and means controlled by the operator and connected to the rack to provide linear movement for the rack to operate the pinion and thereby control the position of the pressing shoe.

15. In an ironing machine, a pressing shoe having a heated surface, pressing means spaced from the shoe and adapted to be moved into cooperative engagement therewith to press material therebetween, a support for supporting the pressing shoe and for carrying it from a poised position spaced from the pressing means to an operative position in engagement therewith, a pivotally supported arm having a free end connected to the support to move the shoe into operative position with movement of the pivotal arm in one direction and to poised position with pivotal movement in the other direction, a pinion secured to the pivotal arm, a rack in engagement with the pinion, an eccentric drive connected to the rack and adapted to give linear movement to the rack, and an adjustable connection between the rack and eccentric drive to control said operative and poised positions of the shoe with adjustments of the adjustable connection.

16. In an ironing machine, a heated ironing shoe, means for pressing cloth against the shoe to impart heat thereto, a support for supporting the shoe in poised position having spaced relationship to the pressing means, a slide for slidably carrying the support and permitting linear motion of the support to an extended position where the shoe is away from the pressing means to afford access to said pressing means, a pivotal arm operatively connected to said slide adapted to move said slide to carry the shoe support therewith and move the shoe into operative engagement with the pressing means to press cloth therebetween, a pinion attached to said arm, a rack in meshing engagement with said pinion, and means for giving lineal movement to said rack to operate the pinion and cause movement of the shoe into operative position in engagement with the pressing means.

17. In an ironing machine, horizontally disposed ironing elements including a heated ironing shoe, a conveying mechanism positioned beneath the ironing shoe and adapted to carry cloth in pressing engagement with the ironing shoe, a cabinet for supporting the conveying means and ironing shoe and including a table surface positioned beneath the conveying means, and a forward shelf forming an extension of the table surface and being movably attached to the cabinet to move between a plurality of positions, one position being located with the forward shelf in the plane of the table surface and forming an extension thereof, and a second position being horizontally aligned with said conveying mechanism to form a shelf for supporting material to be delivered to said conveying means.

18. In an ironing machine, a flat conveying belt being horizontally disposed and having an upper horizontal surface to carry materials through the ironing machine, a flat heated ironing shoe normally positioned in spaced relationship to the conveying belt and adapted to be moved into ironing engagement with said belt, a support for said shoe adapted to carry the shoe into ironing engagement, a cabinet for supporting the conveying belt and ironing shoe and including a flat table surface located beneath the belt, and a forward extension shelf for the table surface being mounted on the cabinet to be movable to a series of positions with one of said positions having the forward shelf located in the plane of the table surface to form an extension thereof, another of said positions having the forward shelf being in the plane of the upper horizontal surface of the conveying belt to form an extension thereof.

19. An ironing machine comprising in combination, a flat heated ironing shoe adapted to engage a material to be ironed, a flat belt conveyor having a horizontally disposed surface with a forward edge, and located beneath the ironing shoe and adapted to be cooperatively engaged by the ironing shoe for ironing operation, means for driving the belt, means for moving the ironing shoe into ironing engagement with the belt, a cabinet for housing operating mechanism of said ironer, a table surface positioned beneath the ironing belt and having a forward edge, and a forward extension shelf supported on the cabinet and movable through a series of positions with the first position in a vertical plane extending between the forward edge of the table surface and the forward edge of the horizontal belt surface, and the second position being in a horizontal plane extending from the forward edge of the horizontal surface of the flat ironing belt to form an extension thereof;

20. An ironing machine comprising operating mechanism including a horizontally disposed heated ironing shoe, a conveying member spaced from the shoe adapted to carry material beneath the ironing shoe, means for driving the conveying member, means for moving the ironing shoe against the conveying member, a cabinet for housing operating mechanism of the machine, a table surface supported on the cabinet beneath the conveying member, and a forward extension shelf supported on the cabinet and movable between a series of positions with a first position being in a horizontal plane as an extension of said table surface, a second position being in a vertical plane between the forward edge of the table and the conveying member, and a third position being in a horizontal plane leading to the conveying member.

21. In an ironing machine, the combination of a heated smooth ironing shoe, a conveying means for carrying material to be ironed in pressure engagement with the shoe, means for driving the conveying means, means for moving the shoe into pressure engagement with the conveying means, a cabinet for housing operating means of the ironing machine including a table surface positioned beneath the conveying means, a table surface extension comprising a flat horizontally disposed shelf member being movable between a series of positions, an arm pivotally connected to support the shelf member and adapted to permit the shelf to be moved from a vertical to a horizontal position, a first link connected to the cabinet and connected to the free end of said shelf supporting arm, a second link also connected to the cabinet and extending substantially parallel to the first link and connected to said arm, said links permitting movement of the shelf supporting arm, and means to hold the shelf in its adjusted positions the first position of the shelf being in a plane parallel to said table surface, the said second position spaced outwardly from the front edge of the table surface with said shelf positioned in vertical plane to guard the space between the conveying means and said table surface.

22. In an ironing machine, a horizontally disposed flat heated ironing shoe, a horizontal ironing belt positioned beneath the shoe and adapted to convey material on an upper surface between the shoe and belt, means to drive the belt, means to move the shoe in an ironing engagement with the belt, a cabinet for operating mechanism including a horizontal table surface located beneath the ironing belt, a front shelf extension supported on the cabinet, a first supporting arm pivotally connected to the shelf extension, a second supporting arm pivotally connected to the cabinet and connected to a lower end of the first shelf supporting arm, said supporting arms being movable to support the shelf in its first position as a continuation of the horizontal plane of the table surface, and in its second position as a continuation of the plane of the upper surface of the conveying belt.

23. In an ironing machine, a heated ironing shoe, pressing means adapted to hold material to be ironed in engagement with the shoe, means for driving the pressing means, means attached to the shoe to bring it into operative engagement with the pressing means, a cabinet for housing operating means of the machine, said cabinet including a horizontal table surface located beneath the pressing means, and a forward shelf extension movable between a series of positions and being carried on a support connected to said cabinet, the shelf extension being horizontal in the first position and being located in a continuation of the plane of the table surface, the shelf being vertical in the second position and spaced from a front edge of said table surface but being in alignment with a forward edge of said ironing shoe.

24. In an ironing machine, a horizontally disposed flat ironing shoe having a smooth under-surface for ironing material, a horizontally disposed resilient ironing belt for carrying material in ironing engagement with the shoe, means for driving the belt, means for moving the shoe into ironing engagement with the belt, a cabinet for housing operating parts of the machine including a forward extension shelf which is movably connected to the cabinet to be fixedly adjusted in a series of positions, said extension shelf being supported by a first supporting arm, a second supporting arm attached to the cabinet and to the first supporting arm, and a third supporting arm also attached between the cabinet and the first supporting arm and being substantially parallel to the second supporting arm, an arcuate slot in the cabinet adjacent to the first supporting arm, a locking pin secured to the first supporting arm and projecting into said slot, a notch located in one end of said arcuate slot for receiving said locking pin, and spring biasing means connected between the first arm and the cabinet and urging the pin into said notch, said notch corresponding in position with one of the fixed positions of said shelf extension.

25. In an ironing machine, a heated ironing shoe, conveying means positioned in opposition to the ironing shoe and adapted to be moved into engagement therewith to press material to be ironed into pressing engagement with the shoe, means for driving the conveying means, a support for the shoe, means for moving the support to bring the shoe into pressing engagement with the conveying means, a cabinet for supporting the operating means and including a table surface positioned beneath the conveying means, a shelf extension movable to a closed position wherein said extension is vertical and corresponds with a forward edge of said shoe and forming an end protecting extension in a vertical position wherein the extension extends between said table surface and the conveying means, and means supporting said shoe with said shoe being movable to a position forward of said conveying means in a position of alignment with said shelf extension.

26. In an ironing machine, a longitudinally extending heated ironing shoe, a horizontally positioned conveying means located beneath the shoe and adapted to carry material to be ironed beneath the shoe, a support for the shoe adapted to move the shoe between a poised position above the conveying means and a position in engagement with the conveying means to press the material to be ironed therebetween, and a holder for said support permitting lateral movement of the shoe between the first poised position, a second extended position where the shoe is rearward of the conveying means and the conveying means is accessible, and a third closed position where the shoe is forward of the conveying means to completely protect the conveying means.

27. An ironing machine comprising an ironing belt for carrying garments through the machine, an ironing shoe poised above said belt and adapted to be moved into pressing engagement with the belt, a frame for supporting the shoe and belt, a machine base, a resilient support for supporting the frame and having sufficient strength to support the frame in an elevated position above the base, and a latch adapted to lock the frame in a lowered position below said elevated position when the resilient support is compressed, said latch having a part secured to the frame and a part secured to the base, said parts adapted to automatically join in latching engagement when the frame is depressed toward the base to compress said resilient support.

28. In an ironing machine, a belt support for the cloth to be ironed, a heated horizontally disposed ironing shoe normally poised over said belt support and adapted to be moved into ironing engagement with said belt support, means for driving the belt support for carrying the cloth beneath the ironing shoe, a yoke shaped support arm at each end of the shoe for carrying the shoe in poised relationship to the belt support, said arms having a first horizontal portion connected to the ends of the shoe, a vertical portion extending downwardly from the horizontal portion and bent outwardly at the lower ends away from the belt support, and a second horizontal portion at the lower end of the vertical portion and positioned laterally outside of the ends of the belt support, and a pair of slides for supporting the second horizontal portions of the support arms and for carrying the arms in lateral sliding movement in order that the shoe may be moved from the poised relationship above the supporting belt to an extended position where access to the belt is readily afforded.

(References on following page)

References Cited in the file of this patent

UNITED STATES PATENTS

| | | |
|---|---|---|
| 452,423 | Blackwell | May 19, 1891 |
| 2,156,712 | West | May 2, 1939 |
| 2,169,753 | Altorfer | Aug. 15, 1939 |
| 2,195,393 | Altorfer | Apr. 2, 1940 |
| 2,252,165 | Castricone | Aug. 12, 1941 |
| 2,262,222 | Castricone | Nov. 11, 1941 |
| 2,299,688 | Ferris | Oct. 20, 1942 |
| 2,306,138 | Pfeffer | Dec. 22, 1942 |
| 2,379,788 | Clark | July 3, 1945 |
| 2,400,497 | Freis | May 21, 1946 |
| 2,538,617 | Davis et al. | Jan. 16, 1951 |
| 2,673,410 | Jones et al. | Mar. 30, 1954 |